April 23, 1940.  E. H. SPIEGL  2,198,134
GRILL
Filed Nov. 12, 1938  3 Sheets-Sheet 2

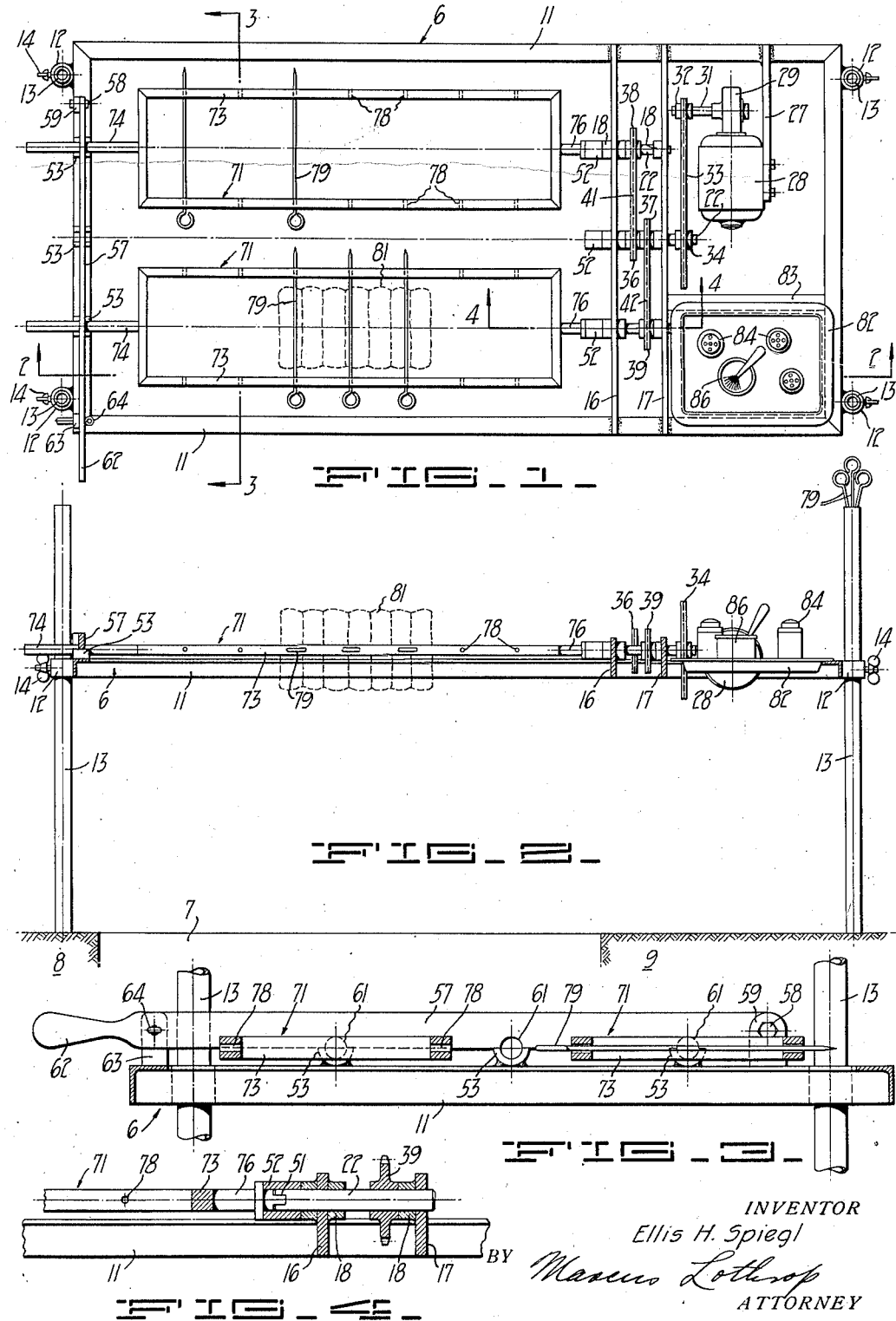

INVENTOR
Ellis H. Spiegl
BY
ATTORNEY

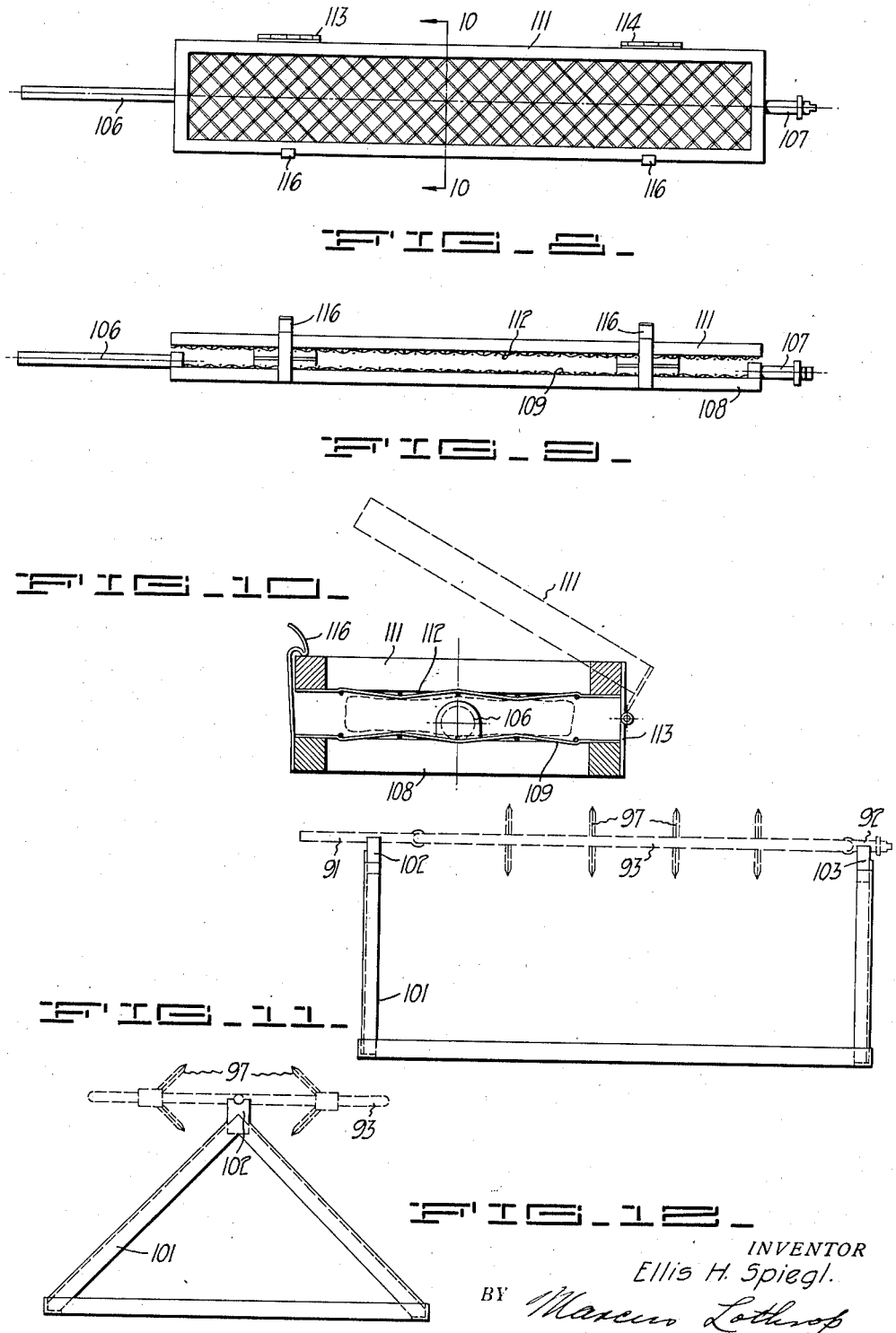

Patented Apr. 23, 1940

2,198,134

UNITED STATES PATENT OFFICE 2,198,134

GRILL

Ellis H. Spiegl, Salinas, Calif.

Application November 12, 1938, Serial No. 240,066

2 Claims. (Cl. 53—5)

My invention relates to means for cooking materials, such as for roasting meats, and is particularly concerned with a mechanism for use over a source of heat such as a bed of coals.

It is an object of my invention to provide an improved grill.

Another object of my invention is to provide a grill in which the material to be roasted is especially received in interchangeable holders for rotation in the machine.

Another object of my invention is to provide a grill in which the material to be cooked can be assembled with the holder prior to introduction into the grill.

The foregoing and other objects are attained in the embodiments of the invention illustrated in the drawings, in which—

Fig. 1 is a plan of a grill constructed in accordance with my invention;

Fig. 2 is a cross-section the plane of which is indicated by the line 2—2 of Fig. 1;

Fig. 3 is a cross-section the plane of which is indicated by the line 3—3 of Fig. 1;

Fig. 4 is a detail cross-section the plane of which is indicated by the line 4—4 of Fig. 1;

Fig. 8 is a plan of a steak holder;

Fig. 9 is a side elevation of the steak holder of Fig. 8;

Fig. 10 is a cross-section the plane of which is indicated by the line 10—10 of Fig. 8;

Fig. 11 is a side elevation of a rack for the fowl holder of Figs. 6 and 7;

Fig. 12 is an end elevation of the rack.

Figure 5:
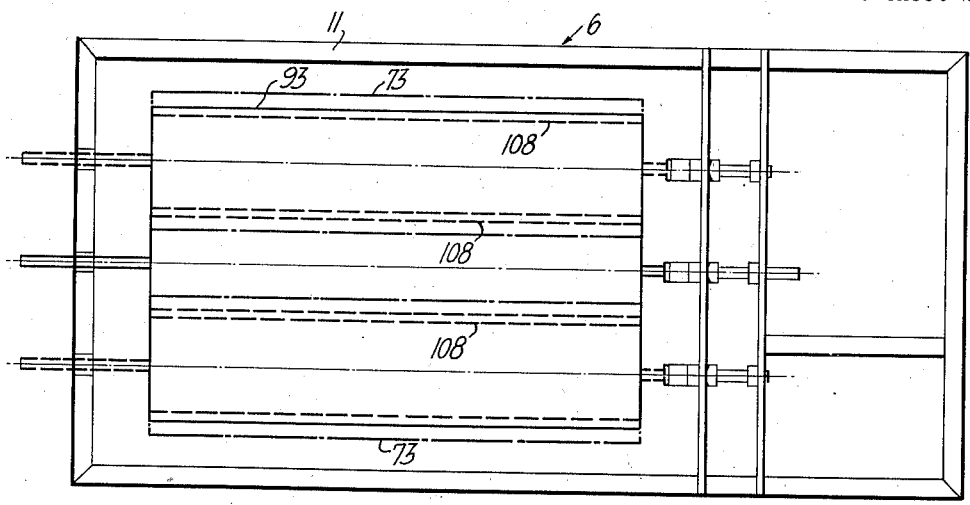
Fig. 5 is a diagrammatic plan showing the positional relationship of the various meat-holders.

In its preferred form, the grill of my invention comprises a horizontal frame which is slidably supported in a selected horizontal position by standards and which contains a plurality of simultaneously driven chucks with one or more of which meat holders can be engaged, the meat holders being also supported by half bearings on the frame which are completed to retain the meat holders in position by a movable locking lever. The chucks are preferably driven by an electric motor mounted so as to move up and down with the frame as the frame is elevated and lowered.

In the form disclosed in the drawings, the grill of my invention includes a frame 6 which preferably occupies a generally horizontally position over a source of heat such as a fire pit 7 located between bases 8 and 9. The frame is preferably a rectangle fabricated of standard angle irons 11 and, adjacent each of the corners, is provided with sockets 12 slidably receiving vertical standards 13 resting upon the bases 8 and 9, being secured in any selected relationship by wing bolts 14 so that the distance between the frame and the fire pit 7 can be regulated at will.

Spanning the framework adjacent one end are spaced cross-bars 16 and 17 each of which is formed with a plurality of journals 18 for receiving chuck shafts 22. These shafts all occupy substantially the same horizontal plane and all have their axes substantially parallel. They are freely rotatable in the journals and are transversely spaced apart uniform distances. In order to drive the chuck shafts by a means which is movable with the framework 6 so that the driving connections are simplified, I preferably provide an extension 27 from one of the frame members 11, and to it secure an electric motor 28 having a reduction gearing 29 integrally assembled therewith. A shaft 31 projects from the gearing 29 and carries a sprocket 32 around which is trained a chain 33 also trained around a sprocket 34 secured to the center shaft 22. As the motor 28 rotates, the shaft 22 is likewise revolved, but at a slower speed.

On the center shaft 22, between the cross-bars 16 and 17, are sprockets 36 and 37 in alignment with which are sprockets 38 and 39 on the outermost chuck shaft 22. Sprocket chains 41 and 42 are trained around the sprockets 36 and 38 and around the sprockets 37 and 39, respectively, so that the outer chuck shafts are rotated in the same direction and in unison with the rotation of the center shaft 22.

At the terminus of each of the chuck shafts, as shown especially in Fig. 4, there is provided a transverse slot 51 which is guarded by a sleeve 52 surrounding and secured on the shaft. In alignment with each of the chucks formed by the slots and the sleeves are shells or half bearings 53, located on the frame 6 and each comprising a semi-cylindrical journal member coaxial with the related chuck.

Co-operating with the various half bearings to form complete journals is a locking lever 57, at one end connected by a pivot pin 58 to an upstanding lug 59 on the framework 6 and between its ends provided with semi-circular notches 61, to continue the bearing partly formed by the shells 53. The other end of the lever 57 is provided with a handle 62 which rests adjacent an upstanding lug 63 pierced to receive a locking or cotter pin 64 also passing through the lever 57.

Adapted to be received in the chucks and journals are various meat holders. As shown in Fig. 1, there are suitably connected with the outer two of the chucks 52, and disposed within the outer two of the shells 53, a pair of roast holders 71 which are so disposed as to rotate freely within the framework 6 and to afford ample clearance with each other. Each meat holder includes a generally rectangular framework 73, preferably of square material, terminating in a shaft 74 running in the journal 53 and in a chuck end 76 engaging the chuck 52. The side bars of the frames 73 at suitable intervals are pierced by through passages 78 adapted to receive skewer pins 79 to hold a roast, such as 81, interposed between the sides of the framework.

When a roast has been suitably positioned in each of the holders 71, the lever 57 is raised, the holders are engaged with the chucks and with the bearings, the lever is lowered and locked in position, and the motor 28 is started. As the frameworks 71 rotate, the roasts are subjected to the action of the heat emanating from the fire pit 7. At the conclusion of the roasting operation the motor 28 is stopped, the lever 57 is released and raised, and the holders 71 are removed from the grill. The removal of the skewer pins 79 releases the roasts 81, and the grill is ready for further utilization.

As a convenience in conducting the roasting operation, I preferably provide a tray 82 located in one corner of the framework 6 and partially supported by a spanning member 83. Upon the tray are located containers 84 for seasoning and a receptacle 86 for basting material.

Figure 6:
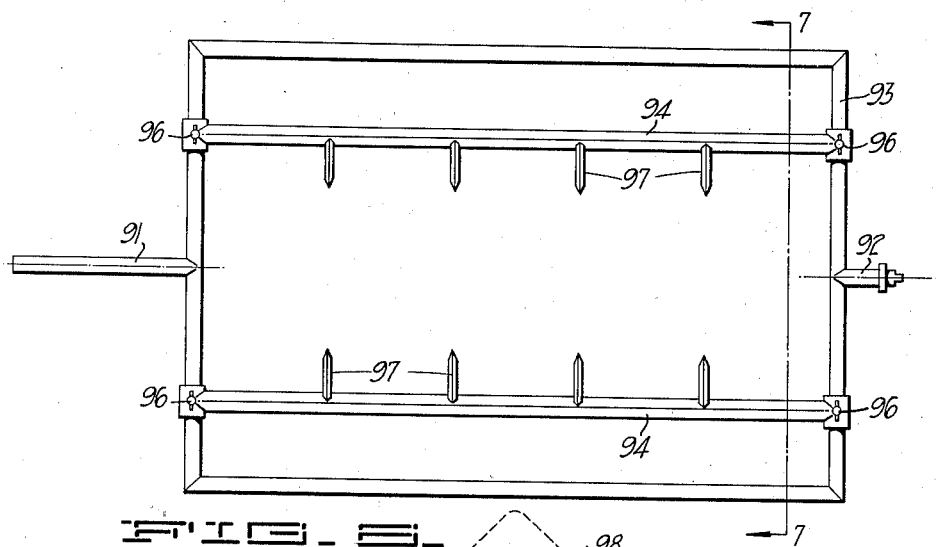
Fig. 6 is a plan of a fowl holder.
Figure 7:
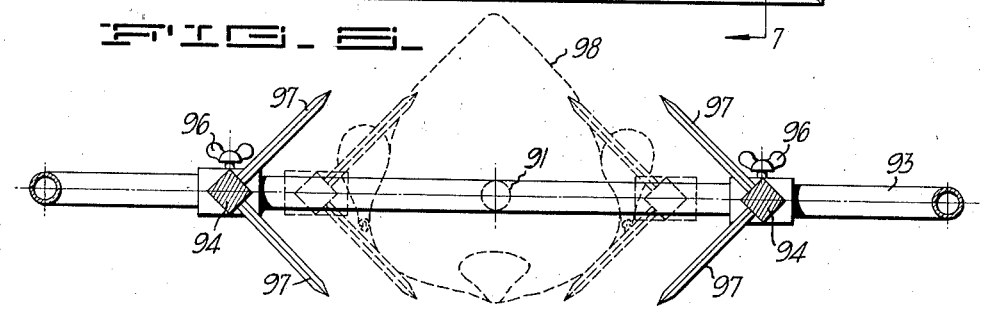
Fig. 7 is a cross-section the plane of which is indicated by the line 7—7 of Fig. 6.

The chucks and bearings are preferably so spaced as to receive alternatively operable meat holders in place of the roast holders 71. For example, the fowl holder shown in Figs. 6 and 7 can be utilized. This preferably includes aligned shafts 91 and 92 projecting from a rectangular tubular framework 93 on which cross-bars 94 are slidably mounted. Wing bolts 96 hold the cross-bars 94 in any selected position. Projecting from each of the cross-bars are skewer pins 97 for engagement with a fowl to be roasted, such as a turkey 98. To facilitate the use of this holder I preferably provide an auxiliary rack 101 (Figs. 11 and 12) which is a framework including half bearings 102 and 103 for receiving the fowl holder prior to its use with the grill. The fowl 98 can be appropriately mounted between the pins 97 and various preliminary operations thereupon may be performed with great facility since the holder can be rotated in the bearings 102 and 103. When the fowl has been adequately prepared and is firmly clamped and pinned in position, the holder is located in the grill between the center chuck 22 and the center journal 53 for the roasting operation.

For the reception of steaks I provide meat holders as shown in Figs. 8, 9 and 10. Preferably three of these structures complete a set. Each includes a pair of axially aligned shafts 106 and 107 merging with a rectangular framework 108 across which a coarse screen or mesh 109 is secured. A comparable frame 111 is positioned in registry with the framework 108 and likewise has a screen 112 across it. A pair of hinges 113 and 114 connect the two frameworks, while spring catches 116 releasably hold them together.

In the use of this arrangement, the upper framework 111, for example, is moved about its hinges, the catches 116 having been released, to an open position (as shown in Fig. 10 by dotted lines). The steaks are positioned on the lower screen 109, and the two frameworks are brought toward each other, thus clamping the steak between them, and the catches 116 maintain the relationship.

The arrangement of the grill is such as to accommodate with great flexibility the grilling of fowl, roasts and steaks or chops, since the fowl holder can be replaced by a pair of roast holders which in turn are replaceable by three steak holders. Whichever holder is being utilized can be positioned for optimum results and without disturbance of its rotation by suitably operating the standards 13.

I claim:

1. A grill comprising a horizontal frame, standards slidably supporting said frame at a selected height, a plurality of chucks rotatably mounted adjacent one end of said frame, means for rotating said chucks in unison, a plurality of journals adjacent the other end of said frame, each journal being in axial alignment with one of said chucks, a plurality of meat holders each engaged with one of said chucks and one of said journals, a common locking lever for releasably retaining all of said holders in said journals, and means for holding said locking lever in retaining position.

2. A grill comprising a rectangular frame, vertical standards slidably supporting said frame horizontally at a selected height, a plurality of chucks rotatably mounted on said frame adjacent one end thereof, means on said frame for rotating all of said chucks in unison, a plurality of half-bearings mounted on said frame adjacent the other end thereof and in axial alignment with said chucks, a locking lever movably mounted on said frame and formed to complete said half-bearings, and means for holding said locking lever against movement.

ELLIS H. SPIEGL.